United States Patent [19]

Takeshita et al.

[11] 4,180,295
[45] Dec. 25, 1979

[54] BRAKE PROPORTIONING MEANS

[75] Inventors: Hiroshi Takeshita, Chiryu; Hiroyuki Kondo, Toyokawa; Takaaki Ohta, Okazaki; Yoshihisa Nomura; Tomoyuki Nogami, both of Toyota, all of Japan

[73] Assignees: Aisin Seiki Kabushiki Kaisha; Toyota Jidosha Kogyo Kabushiki Kaisha, both of Aichi, Japan

[21] Appl. No.: 889,214

[22] Filed: Mar. 23, 1978

[30] Foreign Application Priority Data

Mar. 24, 1977 [JP] Japan .................................. 52-32491

[51] Int. Cl.² ............................................ B60T 8/22
[52] U.S. Cl. ..................................... 303/22 R; 303/6 C
[58] Field of Search .............................. 303/6 C, 22 R

[56] References Cited

U.S. PATENT DOCUMENTS

| 3,804,468 | 4/1974 | Ishikawa et al. | 303/6 C |
| 4,049,322 | 9/1977 | Farr | 303/6 C |

*Primary Examiner*—Duane A. Reger
*Attorney, Agent, or Firm*—Oblon, Fisher, Spivak, McClelland & Maier

[57] ABSTRACT

A device of the type adapted to be interposed between rear wheel brakes of a vehicle and one of dual master cylinders for separate hydraulic circuits to the front and the rear brakes, for not only sensing axle loading and weight shift in order to optimize braking effectiveness but also permitting unrestrained passage of fluid therethrough for the purpose of compensating an accidental failure of the front brakes. The device is characterized by the fact that a load sensing spring is provided for sensing the varying load on vehicle wheels in a manner such that the load sensing spring is rather less loaded in case of the failure of the front brakes than is experienced prior to the failure.

8 Claims, 2 Drawing Figures

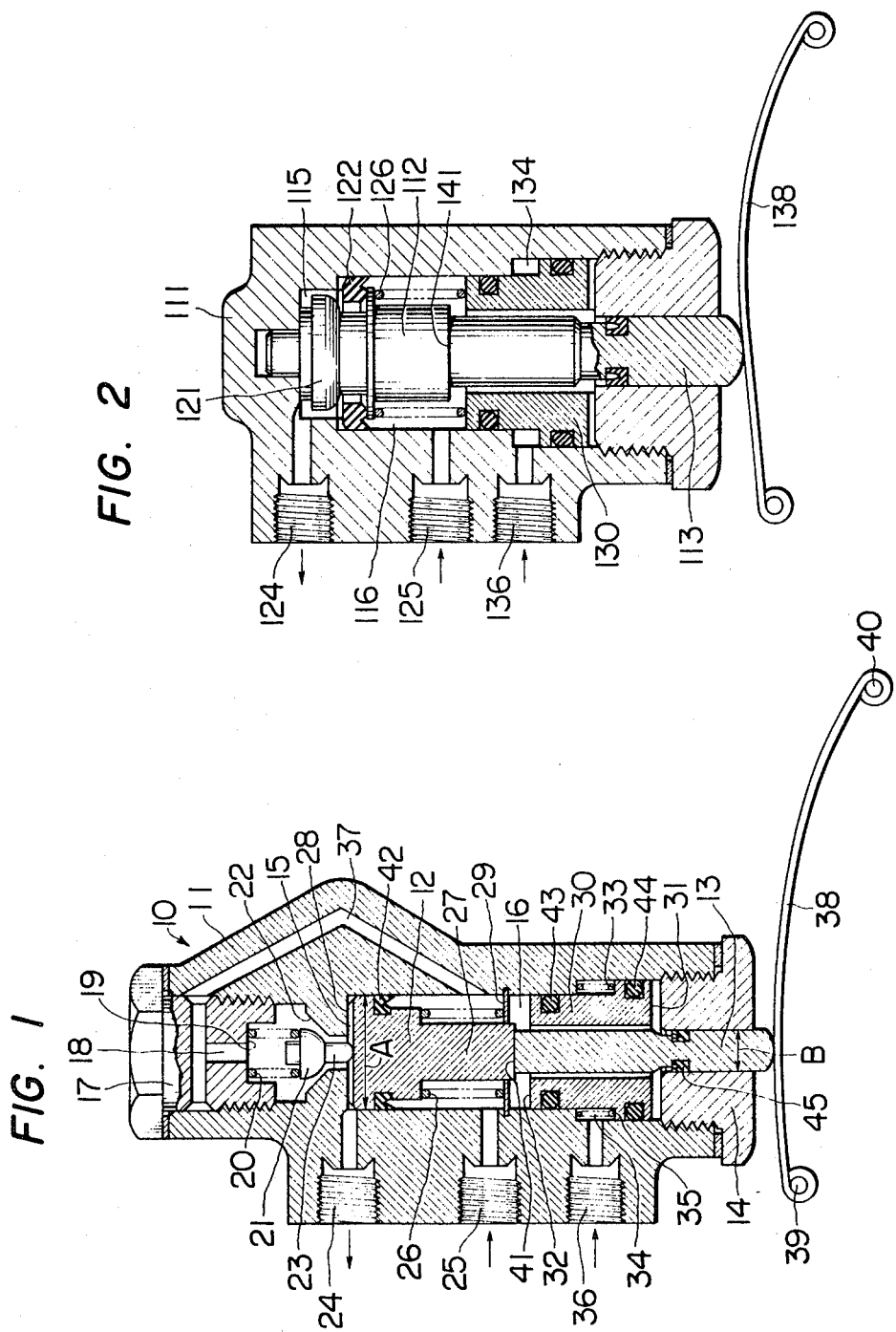

BRAKE PROPORTIONING MEANS

BACKGROUND OF THE INVENTION

This invention relates to a device for use on vehicles equipped with hydraulic brakes, and is adapted to vary the braking force on vehicle wheels depending upon the wheel load as well as the shifting of the weight of the vehicle.

More particularly the present invention relates to a device of the type adapted to be interposed between rear wheel brakes and one of dual master cylinders for separate hydraulic circuits to front and the rear brakes, for not only sensing the axle loading and the weight shift in order to optimize braking effectiveness but also permitting unrestrained passage of fluid therethrough in order to compensate an accidental failure of the front brakes.

Devices are known for providing a ratio, such as 7 to 3, of braking forces on front and rear wheels when the pressure from the master cylinder reaches a predetermined threshold value in case of deceleration of the vehicle by means of the brakes.

Also it has been known in the art to modulate the threshold value in accordance with variation of the axle loading in order that a closer approximation of a desired relationship between front and rear braking may be provided than possible depending only upon the weight shift. In order to attain such modulation, it has been the practice in the art to employ a spring means attached to a vehicle chassis for sensing the axle loading by the height of the chassis therefrom in partially proportioning the braking pressure coactingly with the proportioning depending upon the weight shift.

The devices currently in use are in any case not entirely satisfactory in that any of them tends to subject the load sensing spring to an uncompromising increase of load when in case of an accidental failure of the front brakes, so that possibility of ruin exists for the load sensing spring means.

SUMMARY OF THE INVENTION

Therefore, it is a principal object of this invention to provide a device for use on vehicles equipped with hydraulic brakes and dual master cylinders for separate hydraulic circuits to front and rear brakes, for varying the braking force on vehicle wheels depending upon the wheel load as well as the weight shift of the vehicle, characterized by the fact that the load sensing spring is rather less loaded in case of the failure of the front brakes than is experienced prior to the failure.

Thus in the embodiments of the invention, there are comprised, a cylinder, a piston movable therein which subdivides the cylinder into two chambers toward which it exposes faces differing in area, spring means biasing the piston in the cylinder, a normally open valve controlling intercommunication of the two chambers by intercepting the intercommunication upon a predetermined value of the pressure transmitted by the master cylinder after the piston has started its movement, and load sensing resilient means adapted to be interposed between the piston and one of two masses separated by the known suspension means for partially controlling the effect of the device by the position of the two vehicle masses and hence by the vehicle load.

The device is particularly characterized by provision of means for blockading the above mentioned starting of the piston upon the failure of the front brakes so that the interception by the valve is prevented and unrestrained passage of fluid through the device is thereafter permitted for compensating the failure of the front brakes, while the load sensing resilient means is held in a less loaded position.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a cross sectional view of a device embodying the principles of the present invention; and FIG. 2 is a similar view to FIG. 1, showing a modified embodiment.

DESCRIPTION OF THE PREFERRED EMBODIMENTS

The structure of a pressure varying device 10 according to the invention which, in the specific case acts as a pressure reducer, shall now be described with reference to FIG. 1 of the drawings.

This device 10 comprises a cylinder 11 having movable therein a piston 12 provided with a rod 13, the end of which extends beyond the cylinder 11 through an axial bore formed in a plug 14 screwed into a tapped recess in the body of the cylinder 11. The latter subdivides the inside of the cylinder into two chambers, namely a chamber 15 having the large acting face of the piston 12 turned towards it, and a chamber 16 through which the piston rod 13 extends. The chamber 15 is confined in front of the large face of the piston 12 by a plug 17 screwed into a tapped bore in the body of the cylinder 11 and formed with a conduit 18 and an anchoring central recess 19 for a compressed spring 20. The spring 20 bears against a valve 21 to normally urge thereof toward seating abutment against a seat portion 22. The valve 21 is formed with means in the form of a stud 23 normally spring biased toward abutment against the large face of the piston 12, by the spring 20. The chamber 15 connects with the outside through a connection 24. The other chamber 16 connects with the outside through a connection 25 and encloses a helical spring 26 coiled around the rod or diametrically reduced portion 27, tending to hold the piston 12 close to an annular shoulder 28 forming the seat portion 22. The spring 26 is interposed between the piston 12 and an annular retainer 29 engaging a corresponding annular groove in the internal face of the chamber 16 so that the piston 12 is normally spring-biased by the spring 26 toward abutment against the annular shoulder 28.

Within the chamber 16 is slidably received in a close fitting condition a sleeve 30 having both opposite end annular faces thereof differing in area as shown at 31 and 32, thus forming in its external face a stepped portion 33. The internal face of the chamber 16 is formed to accomodate the stepped external face of the sleeve 30, so that an annular cavity 34 is formed. The annular chamber 34 connects with the outside through a connection 36 and encloses a coiled compressed spring 35 normally urging the sleeve 30 to the plug 14. The sleeve 30 encloses the rod 13 with a clearance therebetween so that passage of fluid is permitted therethrough. The chamber 16 is communicated through a conduit 37 and conduit 18 in the upper plug 17 with the chamber 15. The bottom end of the rod 13 is in resiliently abutment relation with a load sensing leaf spring or resilient member 38 rotatably attached at one end 39 to the device on the chassis of the vehicle (i.e., a first mass) and at the other end 40 to the axle housing (i.e., a second mass) also rotatably through a lever member pivoted to the axle housing so that the piston 12 is upward spring-biased.

The device 10 operates as follows;

Upon flow of pressure fluid from the rear master cylinder to the connection 25, fluid flows through the chamber 16, thence through conduit 37, conduit 18, valve 21, to the chamber 15.

When the pressure of the fluid from the master cylinder reaches a value such that the total hydraulic thrust on the piston 12 (acting downward as viewed in FIG. 1) is higher than the total thrust on the piston by spring 26 and load sensing spring 38, the downward stroke of the piston 12 begins. When the piston moves forward far enough to permit the valve 21 to engage the seat 22 and prevent fluid flow past the valve 21, reduction in pressure begins in the circuit connected with the connection 24 with respect to the pressure transmitted by the front master cylinder. It should be noted that a thrust on the valve 21 by spring 20 is lower than total thrust on the piston by spring 26 and load sensing spring 38.

The reduction will be effected at a ratio depending upon the ratio of the piston areas A and (A-B) exposed to the action by the fluid, where A represents the area of the large acting face of the piston 12 and B represents the cross sectional area of the rod 13. The characteristics of the reaction springs 26 and load sensing spring 38 are decisive with respect to the pressure value at which intervention of the device 10 starts.

The device according to this invention comprises the pressure varying device thus far described type secured to a portion of the chassis (not shown) adjacent, for example, the rear driven axle, and the load sensing spring with one end anchored to the chassis and the other end to the axle housing. The arrangement is such that the spring 38 is preloaded and therefore coacts with the preload of the spring 26, which results in the total upward thrust on the piston 12.

It will be understood that, as load on the driven axle varies, spacing of the chassis and the driven axle, hence the load on the spring 38 and the piston 12 varies. The spring coacts with the other spring 26 to affect operation of the pressure varying device by varying the intervention pressure, that is, the required hydraulic pressure for moving the piston 12 by an extent such as to shut off communication of the chamber 15 and the conduit 18. Obviously, variation in load of spring 38 results in variation in the shut off pressure of the pressure varying device 10.

During the above mentioned operation, the annular chamber 34 is held in pressurized condition across the connection 36 by the front master cylinder (not shown), which results in the downward thrust on the sleeve in cooperation with the coiled spring 35. It will be seen that, since the end faces 31 and 32 differ in area, another thrust reversely results therefrom at a ratio depending upon the ratio of area of the end faces 31 and 32 which are exposed to the action by the fluid within the chamber 16. The characteristics of the spring 35 are decisive with respect to the values of the two opposed thrusts on the sleeve 30 in order to hold the sleeve in the position shown during the normal operation. In particular, the upward thrust on the sleeve 30 balances, during the operation, with the downward thrust on the sleeve which is assisted by the coiled spring 35 in the annular cavity 34.

Failure of the front brakes, hence failure of the pressure in annular chamber 34 will result in defeat of the above described balance of the thrusts so that the sleeve 30 is upward moved far sufficient to abut at its uppermost end against the shoulder 41 of the piston 12, and further to hold lock the valve 21 in opened position shown. The pressure varying or reducing operation of the device 10 is therefore blockaded and compensation for the failure of the front brakes is thus achieved by permitting unrestrained flow of fluid through the pressure varying device 10.

Seals shown at 42 to 45 serve in the known manner in achieving thus far described operation of the pressure varying device.

In FIG. 2 is shown another embodiment of the present invention. Parts in accord with those of the first embodiment are designated by the same numerals in 100 series for ease in understanding the second embodiment and abbreviation of duplicated description. In the second embodiment, valve 121 is integral with the piston 112, and the chamber 116 is normally communicated with the chamber 115 through the annular rubber seat 122 and the valve portion 121, so that there is provided no conduit which corresponds to the conduit 37 in the first embodiment. It will be noted that the pressure reduction will be effected at a ratio depending upon the ratio of the mean sealing area of the rubber seat 122 to the cross sectional area of the rod 113. In this case, the former area is calculated to be larger than the latter cross sectional area.

It is understood that within the principle of the invention, various details can be widely varied from the examples described and shown without departing from the scope of this invention.

What is claimed is:

1. Device for use on vehicles equipped with hydraulic brakes and dual master cylinders for separate hydraulic circuits to front and rear brakes, the device adapted to vary the braking force on the vehicle wheels depending upon the vehicle load as well as shifting of weight of the vehicle, characterized by the following combination:

(a) a pressure varying device secured to one of at least two vehicle masses separated by means of a suspension system, the pressure varying device comprising a cylinder and a piston movable therein which subdivides the cylinder inside into two chambers, toward which it exposes faces differing in area, spring means biasing the piston in the cylinder, a normally open valve controlling intercommunication of the said two chambers which are connected to one of the master cylinders and the braking circuit to the rear brake, respectively, and said valve intercepting the said intercommunication upon a predetermined value of the pressure transmitted by said one of the master cylinders after the piston which is spring-biased by the spring means has started its movement, (b) the pressure varying device having associated therewith means comprising a resilient member interposed between the piston and the other one of the above mentioned vehicle masses separated by the suspension means, the said piston having a rod extending within one of the chambers therebeyond and engaging said resilient member so as to be subjected to a thrust from said resilient member, the resilient member forming at least a part of the said spring means biasing the piston of the pressure varying device, so that the effect of the pressure varying device is at least partially controlled by the position of the two vehicles masses separated by the suspension system and hence by the vehicle load, (c) the pressure varying device further having therewith associated means for blockading the said starting of the piston in response to failure of the front brakes so that the said interception by the said valve is prevented and unrestrained passage of fluid through the pressure varying device is thereafter permitted for compensating the failure of the front brakes, said blockading means comprising a locking member to lock the piston in a position prior to the said starting and said locking member comprising a sleeve surrounding the rod and having opposed end faces each of which is exposed against the fluid pressure in the circuit to the rear wheel brakes and differing in area, thus forming a stepped external surface adapted to define in a slidably fitting cooperation with one of said two chambers an annular chamber connected to the circuit to the front brakes.

2. Device as claimed in claim 1, characterized by the fact that the locking member and the rod cooperate to define an annular clearance therebetween to provide a passageway of fluid pressure extending between the opposed end faces of the locking member.

3. Device as claimed in claim 2, characterized by the fact that the said piston and the rod cooperate to form therebetween a shoulder which is located in a passageway traced by the sleeve when the sleeve moves to a position to blockade the starting of the piston in case of occurence of failure of the front brakes.

4. Device as claimed in claim 3, characterized by the fact that the spring means and the resilient member are both preloaded to normally cooperate to transmit to the piston a thrust in the reverse direction to the direction of the resultant thrust on the piston by the hydraulic pressure by the rear brake master cylinder.

5. Device as claimed in claim 4, characterized by the fact that the valve has a stud and is normally spring-biased toward abutment at the extremity thereof against the face of the piston revealed within the chamber connecting to the rear brakes and a seat is interposed between the face and the valve so that the interception of the intercommunication of the two chambers takes place when the valve seats to the seat during movement of the piston due to the thrust depending upon pressure in the chamber.

6. Device as claimed in claim 4, characterized by the fact that the valve is formed integrally with the piston and an annular cup seal is enclosed in the cylinder in closely sealing relation with the internal face of the cylinder but in annularly spaced relation with the external face of the piston so that the face to which is applied the pressure in the chamber connecting to the rear brakes is imaginarily formed by closing cooperation of the valve and the cup seal which takes place during movement of the piston due to the thrust depending upon the pressure.

7. Device as claimed in claim 1 further comprising a second resilient member disposed within said annular chamber for biasing said sleeve towards said resilient means.

8. Device as claimed in claim 1, wherein said cylinder includes a conduit formed therein intercommunicating with said two chambers.

* * * * *